(12) United States Patent
Brown

(10) Patent No.: US 11,168,536 B2
(45) Date of Patent: Nov. 9, 2021

(54) SEAL APPARATUS AND METHODS OF USE

(71) Applicants: Peak Well Systems Pty Ltd, Bayswater (AU); PEAK WELL SYSTEMS LIMITED, Aberdeen (GB)

(72) Inventor: Gareth Edward George Brown, Aberdeen (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 14 days.

(21) Appl. No.: 16/625,802

(22) PCT Filed: Jun. 28, 2018

(86) PCT No.: PCT/GB2018/051827
§ 371 (c)(1),
(2) Date: Dec. 23, 2019

(87) PCT Pub. No.: WO2019/002883
PCT Pub. Date: Jan. 3, 2019

(65) Prior Publication Data
US 2021/0131219 A1  May 6, 2021

(30) Foreign Application Priority Data
Jun. 28, 2017 (GB) ..................... 1710367

(51) Int. Cl.
*E21B 33/12* (2006.01)
*E21B 33/128* (2006.01)
*E21B 33/129* (2006.01)

(52) U.S. Cl.
CPC ........ *E21B 33/1216* (2013.01); *E21B 33/128* (2013.01); *E21B 33/1293* (2013.01)

(58) Field of Classification Search
CPC .. E21B 33/12; E21B 33/1208; E21B 33/1216; E21B 33/134; E21B 33/1291; E21B 33/1292; E21B 33/1293
See application file for complete search history.

(56) References Cited

U.S. PATENT DOCUMENTS 2,701,615 A  2/1955  Riordan, Jr.
3,572,627 A  3/1971  Jones
(Continued)

FOREIGN PATENT DOCUMENTS

GB  2296520 A  7/1996
GB  2432600 A  5/2007
(Continued)

OTHER PUBLICATIONS

Macmillan Dictionary—Unitary—https://www.macmillandictionary.com/dictionary/american/unitary Accessed 2021 (Year: 2021).*
(Continued)

*Primary Examiner* — David Carroll
(74) *Attorney, Agent, or Firm* — Ashley E. Brown

(57) ABSTRACT

A seal apparatus and method of use is described. The apparatus comprises a seal assembly comprising a plurality of seal elements assembled together to form a ring structure around a longitudinal axis. The ring structure is operable to be moved between an expanded condition and a collapsed condition by movement of the plurality of seal elements. The plurality of seal elements is operable to be moved between the expanded and collapsed conditions by sliding with respect to one another along respective contact surfaces. Each of the plurality of seal elements is each formed from a compliant, compressible or resilient material.

18 Claims, 6 Drawing Sheets

(56) References Cited

U.S. PATENT DOCUMENTS

| | | |
|---|---|---|
| 3,915,424 A | 10/1975 | LeRouax |
| 4,923,007 A | 5/1990 | Sanford et al. |
| 5,010,958 A | 4/1991 | Meek et al. |
| 6,598,672 B2 | 7/2003 | Bell et al. |
| 7,290,603 B2 | 11/2007 | Hiorth et al. |
| 7,921,921 B2 | 4/2011 | Bishop et al. |
| 8,083,001 B2 | 12/2011 | Conner et al. |
| 8,167,033 B2 | 5/2012 | White |
| 2007/0131413 A1* | 6/2007 | Millet ............... E21B 33/1216 166/115 |
| 2012/0227987 A1 | 9/2012 | Castriotta et al. |
| 2013/0319654 A1* | 12/2013 | Hiorth ............... E21B 33/128 166/179 |
| 2014/0116680 A1* | 5/2014 | Mercer ............... E21B 33/12 166/212 |
| 2016/0222749 A1* | 8/2016 | Ellison ............... E21B 33/1208 |

FOREIGN PATENT DOCUMENTS

| | | |
|---|---|---|
| GB | 2485004 A | 5/2012 |
| GB | 2488152 A | 8/2012 |
| WO | 2017109506 A2 | 6/2017 |
| WO | 2017109508 A1 | 6/2017 |
| WO | 2017109509 A1 | 6/2017 |
| WO | 2018087553 A1 | 5/2018 |

OTHER PUBLICATIONS

International Search Report and Written Opinion issued in the related PCT Application PCT/GB2018/051827, dated Oct. 16, 2018 (11 pages).

Combined Search and Examination Report issued in related GB Application 1810681.5, dated Nov. 15, 2018 (9 pages).

Examination Report issued in related GB Application 1810681.5, dated Nov. 12, 2019 (2 pages).

Communication pursuant to Article 94(3) issued in EP Patent Application No. 18752188.5 dated Feb. 8, 2021, 6 pages.

\* cited by examiner

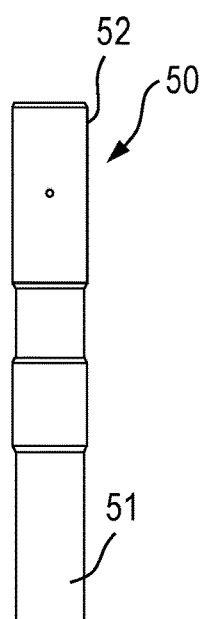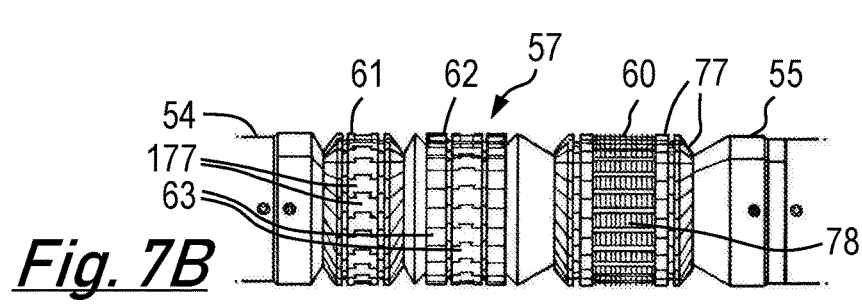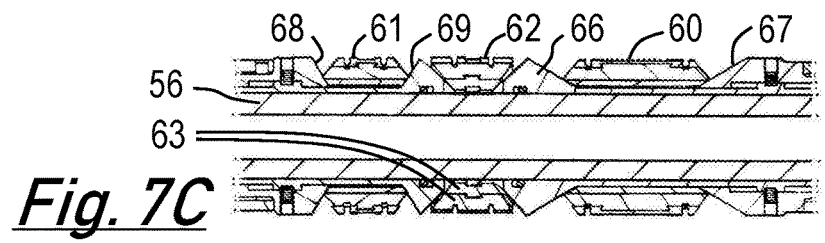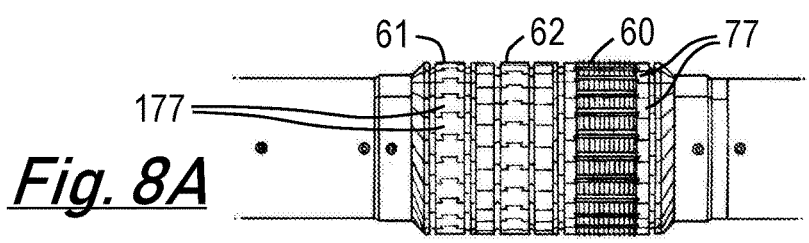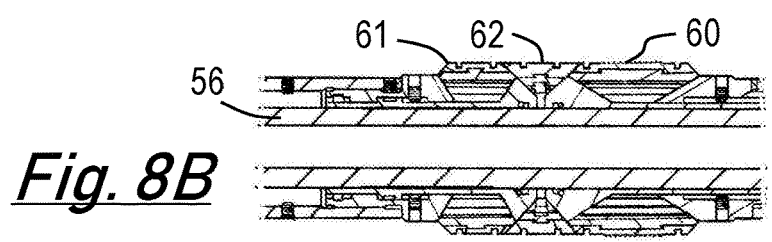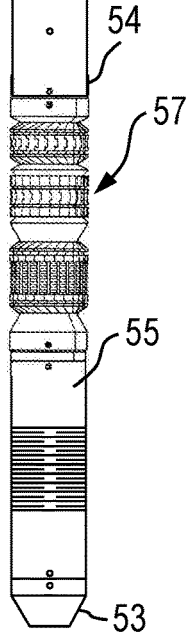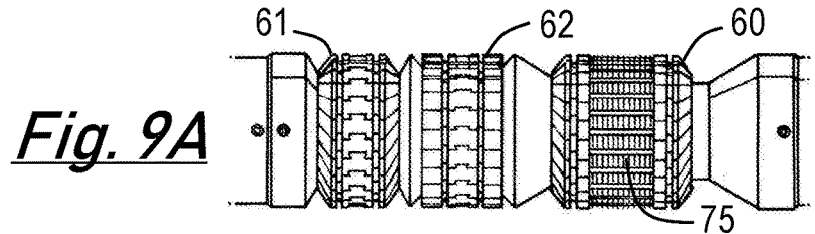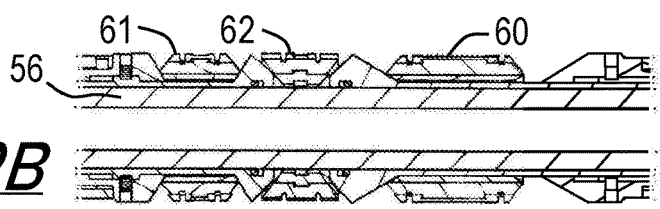
Fig. 7A  Fig. 7B  Fig. 7C  Fig. 8A  Fig. 8B  Fig. 9A  Fig. 9B

SEAL APPARATUS AND METHODS OF USE

CROSS-REFERENCE TO RELATED APPLICATIONS

This application is a 371 national stage application of PCT/GB2018/051827, filed Jun. 28, 2018, which claims the benefit of Great Britain Application No. 1710367.2, filed Jun. 28, 2017, the disclosures of which are incorporated herein by reference.

FIELD OF THE INVENTION

The present invention relates to a seal apparatus and methods of use, and in particular aspects, to a segmented seal apparatus in the form of a ring, operable to move between a collapsed condition and an expanded condition. The invention also relates to tools and devices incorporating the seal apparatus and methods of use. Preferred embodiments of the invention relate to oilfield apparatus (including but not limited to downhole apparatus and wellhead apparatus) incorporating the seal apparatus and methods of use.

BACKGROUND TO THE INVENTION

In many fields of mechanical engineering, and in the field of hydrocarbon exploration and production in particular, it is known to provide flow barriers and seal elements, which may take the form of plugs and packers.

A typical seal element of a downhole tool is a unitary annular elastomeric element, sized to an outer diameter suitable for running the tool. During deployment, the seal element is compressed to expand radially outwardly into contact with a surrounding surface, and the seal element is designed to seal against a pressure differential between respective upper and lower annular regions on opposing sides of the seal element. It is known to provide anti-extrusion rings positioned between a packer or seal element and its actuating slip members, typically formed from a split or segmented metallic ring. During deployment of the packer or seal element, the segments of the anti-extrusion rings move to a radially expanded condition. During expansion and at the radially expanded condition, spaces are formed between the segments, as they are required to occupy a larger annular volume. These spaces create extrusion gaps, which may result in failure of the packer or seal under working conditions.

Various configurations have been proposed to minimise the effect of spaces between anti-extrusion segments, including providing multi-layered rings, such that extrusion gaps are blocked by an offset arrangement of segments. For example, U.S. Pat. No. 6,598,672 describes an anti-extrusion rings for a packer assembly which has first and second ring portions which are circumferentially offset to create gaps in circumferentially offset locations.

U.S. Pat. No. 2,701,615 discloses a well packer comprising an arrangement of crowned spring metal elements which are expanded by relative movement.

Other proposals, for example those disclosed in U.S. Pat. Nos. 3,572,627, 7,921,921, US 2013/0319654, U.S. Pat. Nos. 7,290,603 and 8,167,033, include arrangements of circumferentially lapped segments. U.S. Pat. No. 3,915,424 describes a similar arrangement in a drilling BOP configuration, in which overlapping anti-extrusion members are actuated by a radial force to move radially and circumferentially to a collapsed position which supports annular sealing elements. Such arrangements avoid introducing extrusion gaps during expansion, but create a ring with uneven or stepped faces or flanks. These configurations do not provide an unbroken support wall for a sealing element, are spatially inefficient, and may be difficult to reliably move back to their collapsed configurations.

U.S. Pat. No. 8,083,001 proposes an alternative configuration in which two sets of wedge shaped segments are brought together by sliding axially with respect to one another to create an expanded gauge ring.

While anti-extrusion devices can reduce the damage to a seal element during use as a pressure isolation barrier, the designs are often insufficient in reducing the extrusion gaps to an acceptable level, particularly for high differential pressure applications. Furthermore, during deployment, compression of the seal element to expand radially outwardly into contact with the surrounding surface subjects the seal element to substantial stresses and strains, even before the seal is exposed to differential pressures, with further stresses and strains experienced during use as a pressure isolation barrier.

In many applications, it is necessary or desirable to radially retract the seal element to enable retrieval of the tool. Satisfactory retraction of the seal element may be compromised by damage to the seal element caused by stresses and strains experienced during its deployment, as well as by the differential pressures it is exposed to during use as a pressure isolation barrier. A retrievable bridge plug is one type of a downhole tool that is located and set to isolate a part of the wellbore, in a way that enables it to be unset and retrieved from the wellbore after use. A typical retrievable bridge plug includes an arrangement of slips for anchoring the plug in the well, and a seal element for creating a pressure isolation barrier. Accordingly, the seal element is subject to risk of damage during deployment and use as described above, which may be detrimental to the satisfactory retraction of the tool.

WO2017/109506, WO2017/109508, WO2017/109509 and WO2018/087553 describe arrangements of expanding and collapsing apparatus which create solid rings at their expanded conditions and use in a wide range of applications, including effective performance as anti-extrusion rings for adjacent seal elements.

SUMMARY OF THE INVENTION

It is amongst the claims and objects of the invention to provide a seal apparatus and methods of use which obviate or mitigate disadvantages of previously proposed seal apparatus and methods.

It is amongst the aims and objects of the invention to provide an oilfield apparatus, including a downhole apparatus or a wellhead apparatus, incorporating a seal apparatus, which obviates or mitigates disadvantages of prior art oilfield apparatus. Further aims and objects of the invention will be apparent from reading the following description.

According to a first aspect of the invention, there is provided a seal apparatus comprising:

a seal assembly comprising a plurality of seal elements assembled together to form a ring structure around a longitudinal axis;

wherein the ring structure is operable to be moved between an expanded condition and a collapsed condition by movement of the plurality of seal elements;

and wherein the plurality of seal elements is operable to be moved between the expanded and collapsed conditions by sliding with respect to one another along respective contact surfaces;

and wherein each of the plurality of seal elements is each formed from a compliant, compressible or resilient material.

The plurality of seal elements may be formed from a plastic, rubber, or elastomeric material, which may comprise a rubberised plastic. The plurality of seal elements may be fully formed from the compliant, compressible or resilient material. Each of the plurality of seal elements may be a unitary seal element formed from the compliant, compressible or resilient material.

The plurality of seal elements may be formed from a nitrile rubber such as a Hydrogenated Nitrile Butadiene Rubber (HNBR). Alternatively, or in addition, the plurality of seal elements may be formed from a fluoroelastomer, fluoropolymer or fluoro-rubber, which may for example be an FKM or FPM such as the FPM manufactured by or under license from DuPont Performance Elastomers and designated by the registered trade mark VITON®. Alternatively, or in addition, the plurality of seal elements may be formed from a fluoroelastomer based upon an alternating copolymer of tetrafluoroethylene and propylene rubber, such as the fluoropolymer manufactured by or under license from Asahi Glass Co., Ltd and designated by the registered trade mark AFLAS®.

Embodiments of the invention may comprise seal elements formed from a material with a hardness greater than that of rubbers such as HNBR, and may for example comprise a synthetic fluoropolymers of tetrafluoroethylene such as polytetrafluoroethylene (PTFE), polyaryletherketones such as polyether ether ketone (PEEK), or thermoplastics with suitable hardness characteristics while retaining the requisite compliance, compressibility or resilience of the material.

Embodiments of the invention may comprise a plurality of seal elements formed from different materials, or formed with different material characteristics. For example, alternate or adjacent seal elements of the plurality of seal elements of the ring structure may be formed from a different material, or with different material characteristics. Sequential seal elements in the ring structure may be alternately formed from different materials (e.g. HNBR and PTFE) and/or sequential seal elements in the ring structure may be alternately formed from the same class of material or compound with different material characteristics. In one embodiment, the sequential seal elements in the ring structure may be alternately formed from an HNBR or PTFE with differing hardness characteristics. Such configurations may mitigate against the effects of high pressure and/or high temperature, which may tend to cause vulcanisation or otherwise fuse the seal elements together.

At least a part of one or more of the plurality of seal elements may be coated with a material to assist in mitigating against vulcanisation and/or fusion of the seal elements. The coating may be a low-friction material, for example a coating of PTFE.

Optionally seal elements are formed by a three-dimensional printing process. Optionally the seal elements are formed by an injection moulding process. Alternatively, or in addition, the seal elements are formed by a casting process. Alternatively, or in addition, the seal elements are formed by machining a seal element from a body of material.

The ring structure is preferably operable to be moved between the expanded and collapsed conditions to be presented to a surface in use. The ring structure may be operable to be expanded or collapsed to a seal diameter, at which the plurality of seal elements is presented to the surface in use.

The seal diameter may be an expanded diameter of the ring structure, and may be an outer diameter of the ring structure. Alternatively, the seal diameter may be a collapsed diameter of the ring structure, and may be an inner diameter of the ring structure.

The surface may be a cylindrical surface, with which the seal apparatus is configured to create a seal in use. The surface may have a diameter equal to the seal diameter to which the seal apparatus is operable to expand or collapse. The surface may be an inner surface of a pipe, tubular, tool or borehole. The surface may be an outer surface of an object, including but not limited to a tubular, pipe, a mandrel, a rod, drill pipe, a cable, or a wireline.

By moving the plurality of seal elements between the expanded and collapsed conditions by sliding with respect to one another along respective contact surfaces, the seal elements may be deployed to a seal diameter with negligible stress or strain being introduced into the seal elements during deployment.

The seal apparatus may comprise one or more anti-extrusion and/or support rings for the seal assembly.

The seal apparatus may comprise one or more additional expanding and collapsing ring structures, which may function as anti-extrusion and/or support rings for the seal assembly.

The one or more additional expanding and collapsing ring structures may comprise a plurality of elements assembled together to form a ring structure around the longitudinal axis, and/or may be operable to be moved between an expanded condition and a collapsed condition by movement of the plurality of elements. The plurality of seal elements of the operable to be moved between the expanded and collapsed conditions by sliding with respect to one another along respective contact surfaces. The plurality of elements may each be formed from a harder material than the material from which the seal elements are formed, and may be formed from a metal, metal alloy, or composite material.

The seal apparatus may comprise first and second additional expanding and collapsing ring structures, which may be disposed on opposing axial sides of the seal assembly.

The plurality of seal segments may each be based on a notional wedge-shaped segment of a ring centred on an axis, with each notional wedge-shaped segment being inclined with respect to the radial direction of the ring.

The ring structure may be oriented in a plane around the longitudinal axis. The ring structure may be operable to be moved between an expanded condition and a collapsed condition by movement of the plurality of elements on actuation by an axial force. The plane of the ring structure may be perpendicular to the longitudinal axis. The ring structure, and its plane of orientation, may be operable to move on the apparatus during expansion and/or collapsing. The movement of the plane may be an axial sliding movement, during expanding and/or collapsing of the ring structure.

The plurality of seal segments may be operable to be moved between the expanded and collapsed conditions by sliding with respect to one another in the plane of the ring structure, optionally in a direction tangential to a circle concentric with the ring structure. The seal elements may be configured to move between their expanded and collapsed radial positions in a path which is tangential to a circle described around and concentric with the longitudinal axis.

Preferably, each element of the ring structure comprises a first contact surface and second contact surface respectively in abutment with first and second adjacent seal elements.

The first contact surface and/or the second contact surface may be oriented tangentially to a circle described around and concentric with the longitudinal axis. The first contact surface and the second contact surface are preferably non-parallel. The first contact surface and the second contact surface may converge towards one another in a direction towards an inner surface of the ring structure (and may therefore diverge away from one another in a direction away from an inner surface of the ring structure).

At least some of the elements are preferably provided with interlocking profiles for interlocking with an adjacent seal element. Preferably the interlocking profiles are formed in the first and/or second contact surfaces. Preferably, a seal element is configured to interlock with a contact surface of an adjacent seal element. Such interlocking may prevent or restrict separation of assembled adjacent seal elements in a circumferential and/or radial direction of the ring structure, while enabling relative sliding movement of adjacent seal elements.

Preferably, at least some of, and more preferably all of, the elements assembled to form a ring structure are identical to one another, and each comprises an interlocking profile which is configured to interlock with a corresponding interlocking profile on another seal element. The interlocking profiles may comprise at least one recess such as groove, and at least one protrusion, such as a tongue or a pin, configured to be received in the groove. The interlocking profiles may comprise at least one dovetail recess and dovetail protrusion.

The first and second contact surfaces of an element may be oriented on first and second planes, which may intersect an inner surface of the ring at first and second intersection lines, such that a sector of an imaginary cylinder is defined between the longitudinal axis and the intersection lines. The central angle of the sector may be 45 degrees or less. Such a configuration corresponds to eight or more seal elements assembled together to form the ring structure.

Preferably, the central angle of the sector is 30 degrees or less, corresponding to twelve or more seal elements assembled together to form the ring. More preferably, the central angle of the sector is in the range of 10 degrees to 20 degrees, corresponding to eighteen to thirty-six seal elements assembled together to form the ring. In a particularly preferred embodiment, the central angle of the sector is 15 degrees, corresponding to twenty-four seal elements assembled together to form the ring structure.

Preferably, an angle described between the first contact and second contact surfaces corresponds to the central angle of the sector. Preferably therefore, an angle described between the first contact and second contact surfaces is in the range of 10 degrees to 20 degrees, and in a particularly preferred embodiment, the angle described between the first contact and second contact surfaces is 15 degrees, corresponding to twenty-four seal elements assembled together to form the ring structure.

In some embodiments, the apparatus is operated to provide a seal in its expanded condition, and in other embodiments, the apparatus is operated to provide a seal in its collapsed condition. Preferably, seal elements forming the ring structure are mutually supportive in an operating condition of the apparatus. Where the operating condition of the apparatus its expanded condition (i.e. when the apparatus is operated in its expanded condition), the ring structure is preferably a substantially solid ring structure in its expanded condition, and the seal elements may be fully mutually supported.

Where the operating condition of the apparatus its collapsed condition (i.e. when the apparatus is operated in its collapsed condition), the ring structure is preferably a substantially solid ring structure in its collapsed condition, and the seal elements may be fully mutually supported.

The seal apparatus may comprise a formation configured to impart a radial expanding or collapsing force component to the seal elements of a ring structure from an axial actuation force. The apparatus may comprise a pair of formations configured to impart a radial expanding or collapsing force component to the seal elements of a ring structure from an axial actuation force. The formation (or formations) may comprise a wedge or wedge profile, and may comprise a cone wedge or wedge profile.

The seal elements may comprise side walls or flanks shaped to cooperate with the formation or formations configured to impart a radial expanding or collapsing force component to the seal elements. The formation or formations may define a wedge angle, and the side walls or flanks may define a flank angle corresponding to the wedge angle. The wedge angle may be in the range of 15 degrees to 75 degrees. The wedge angle may be selected from the group of wedge angles consisting of 30 degrees; 45 degrees or 60 degrees.

The apparatus may comprise a biasing means, which may be configured to bias the ring structure to one of its expanded or collapsed conditions. The biasing means may comprise a circumferential spring, a garter spring, or a spiral retaining ring. The biasing means may be arranged around an outer surface of a ring structure, to bias it towards a collapsed condition, or may be arranged around an inner surface of a ring structure, to bias it towards an expanded condition. One or more elements may comprise a formation such as a groove for receiving the biasing means. Preferably, grooves in the elements combine to form a circumferential groove in the ring structure. Multiple biasing means may be provided on the ring structure.

According to a second aspect of the invention, there is provided a seal apparatus comprising:

a plurality of seal elements assembled together to form a ring structure around a longitudinal axis;

wherein the ring structure is operable to be moved between an expanded condition and a collapsed condition;

wherein in the expanded condition, the plurality of elements combine to form a solid seal ring structure having a substantially smooth surface;

and wherein each of the plurality of seal elements is formed from a compliant, compressible or resilient material.

The substantially smooth surface may comprise a first surface portion configured for sealing with an external surface to the seal assembly, for example an inner surface of a cylinder or bore. The first surface portion may comprise an outer cylindrical surface. The substantially smooth surface may comprise a second surface portion configured for sealing with an internal surface to the seal assembly, for example an outer surface of a tubular, cylinder or mandrel on which it is assembled, or a conical or other wedge surface of the apparatus. The substantially smooth surface may comprise a third surface portion, also configured for sealing with an internal surface to the seal assembly, for example an outer surface of a tubular, cylinder or mandrel on which it is assembled, or a conical or other wedge surface of the apparatus. The second and third surface portions may be axially separated from one another.

The substantially smooth surface may comprise a smooth circular profile in a plane parallel to the plane of the ring structure. The substantially smooth outer surface may be substantially continuous or unbroken at a seal diameter. Preferably, the smooth outer surface comprises one or more smooth side surfaces. The substantially smooth outer surface may comprise a smooth radially extending surface, and may comprise a first side of an annular projection defined by the ring structure in its expanded condition. The smooth surface may comprise a first side and an opposing second side of an annular projection defined by the ring structure in its expanded condition. Thus, one or more flanks or faces of the ring structure, which are the surfaces presented in the longitudinal direction, may have smooth surfaces.

Embodiments of the second aspect of the invention may include one or more features of the first aspects of the invention or its embodiments, or vice versa.

According to a third aspect of the invention, there is provided an oilfield tool comprising the apparatus of any of the first or second aspects of the invention.

The oilfield tool may be a downhole tool. Alternatively, the oilfield tool may comprise a wellhead tool.

The downhole tool may comprise a downhole tool selected from the group consisting of a plug, a packer, an anchor, a tubing hanger, or a downhole locking tool.

The plug may be a bridge plug, and may be a retrievable bridge plug. Alternatively, the plug may be a permanent plug.

According to a fourth aspect of the invention, there is provided a downhole plug comprising the seal apparatus of any of the first or second aspects of the invention, and at least one additional expanding and collapsing ring structure disposed on an axial side of the seal assembly of the downhole plug.

The plug may comprise first and second additional expanding and collapsing ring structures, which may be disposed on opposing axial sides of the seal assembly.

The one or more additional expanding and collapsing ring structures may comprise a plurality of elements assembled together to form a ring structure around the longitudinal axis, and/or may be operable to be moved between an expanded condition and a collapsed condition by movement of the plurality of elements. The plurality of seal elements of the operable to be moved between the expanded and collapsed conditions by sliding with respect to one another along respective contact surfaces. The plurality of elements may each be formed from a harder material than the material from which the seal elements are formed, and may be formed from a metal, metal alloy, or composite material. The plurality of elements may be provided with one or more functional formations thereon, for interacting with an auxiliary surface.

The one or more additional ring structures may have one or more functions selected from the group of functions consisting of: anti-extrusion for the seal assembly, support for the seal assembly, or anchoring of the apparatus in a tubular or borehole.

The seal apparatus may comprise first and second additional expanding and collapsing ring structures, which may be disposed on opposing axial sides of the seal assembly.

Where the downhole plug comprises first and second additional expanding and collapsing ring structures, disposed on opposing axial sides of the seal assembly, the first additional expanding and collapsing ring structure may be an anchor ring structure or slip assembly for the downhole plug, and the second additional expanding and collapsing ring structure may be an anti-extrusion ring structure. Alternatively, both the first and second additional expanding and collapsing ring structures may be anchor ring structures or slip assemblies for the downhole plug. The anchor ring structures or slip assemblies for the downhole plug, may provide an anti-extrusion function for the seal assembly.

Alternatively, both the first and second additional expanding and collapsing ring structures may be anti-extrusion structures for the downhole plug. Optionally, an anchor or slip assembly for the downhole plug may be provided at an axially separated location on the plug. The anchor or slip assembly may be implemented in a third additional expanding and collapsing ring structure, which may comprise a plurality of elements assembled together to form a ring structure around the longitudinal axis, and/or may be operable to be moved between an expanded condition and a collapsed condition by movement of the plurality of elements.

Embodiments of the fourth aspect of the invention may include one or more features of the first to third aspects of the invention or their embodiments, or vice versa.

According to a fifth aspect of the invention, there is provided a method of sealing a bore, the method comprising:
providing a seal assembly comprising a plurality of seal elements assembled together to form a ring structure around a longitudinal axis; wherein each of the plurality of seal elements is formed from a compliant, compressible or resilient material;
imparting a force to the ring structure to move the plurality of elements by sliding with respect to one another; thereby moving the ring structure from a collapsed condition to an expanded condition.

Embodiments of the fifth aspect of the invention may include one or more features of the first to fourth aspects of the invention or their embodiments, or vice versa.

According to a sixth aspect of the invention, there is provided a method of releasing a seal in a bore, the method comprising:
providing a seal assembly comprising a plurality of seal elements assembled together to form a ring structure around a longitudinal axis; wherein each of the plurality of seal elements is formed from a compliant, compressible or resilient material;
releasing or reducing a force from the ring structure to move the plurality of elements from a sealed condition by sliding with respect to one another, thereby moving the ring structure from an expanded condition to a collapsed condition.

Embodiments of the sixth aspect of the invention may include one or more features of the first to fifth aspects of the invention or their embodiments, or vice versa.

According to a seventh aspect of the invention, there is provided a method of setting a downhole plug having a seal assembly comprising plurality of seal elements assembled together to form a seal ring structure around a longitudinal axis, wherein each of the plurality of seal elements is formed from a compliant, compressible or resilient material; and one or more additional expanding and collapsing ring structures disposed on an axial side of the seal assembly;
the method comprising:
positioning the downhole plug at a desired wellbore location; and
imparting a force to the downhole plug;
wherein the imparted force moves the plurality of elements of the seal ring structure by sliding with respect to one another, thereby moving the seal ring structure from a collapsed condition to an expanded condition;
and wherein the imparted force moves the one or more additional ring structures from a collapsed condition to an expanded condition.

The one or more additional ring structures may comprise an anti-extrusion ring structure for the seal assembly. Alternatively, or in addition, the one or more additional ring structures may comprise an anchor ring structure or slip assembly for the downhole plug.

The one or more additional expanding and collapsing ring structures may comprise a plurality of elements assembled together to form a ring structure around the longitudinal axis, and/or may be operable to be moved between an expanded condition and a collapsed condition by movement of the plurality of elements.

The method may comprise moving the one or more additional ring structures from a collapsed condition to an expanded condition prior to moving the seal ring structure to its expanded condition. Thus, where the one or more additional ring structures comprises an anchor ring structure or slip assembly for the downhole plug, the plug may be anchored in the bore prior to the seal assembly being fully expanded.

The method may comprise moving the plurality of elements of the seal ring structure to an expanded condition and moving the one or more additional ring structures from a collapsed condition to an expanded condition by the same imparted force, or may comprise imparting a force sequentially to move the plurality of elements of the seal ring structure to an expanded condition and moving the one or more additional ring structures from a collapsed condition to an expanded condition.

The downhole plug may comprise first and second additional expanding and collapsing ring structures, which may be disposed on opposing axial sides of the seal assembly.

The method may comprise imparting a force to move the first and second condition and moving the one or more additional ring structures from respective collapsed conditions to respective expanded conditions.

Embodiments of the seventh aspect of the invention may include one or more features of the first to sixth aspects of the invention or their embodiments, or vice versa.

According to an eighth aspect of the invention, there is provided a method of retrieving a downhole plug from a wellbore, the downhole plug having a seal assembly comprising plurality of seal elements assembled together to form a seal ring structure around a longitudinal axis, wherein the plurality of seal elements are each formed from a compliant, compressible or resilient material; and one or more additional expanding and collapsing ring structures disposed on an axial side of the seal assembly;

the method comprising:

releasing or reducing a force from the ring structure to move the seal ring structure from an expanded condition to a collapsed condition;

and wherein releasing or reducing the force moves the one or more additional ring structures from an expanded condition to a collapsed condition.

Embodiments of the eighth aspect of the invention may include one or more features of the first to seventh aspects of the invention or their embodiments, or vice versa.

According to a further aspect of the invention, there is provided a pipeline tool comprising the apparatus of any preceding aspect of the invention.

BRIEF DESCRIPTION OF THE DRAWINGS

There will now be described, by way of example only, various embodiments of the invention with reference to the drawings, of which:

FIGS. 7A to 7C are respectively elevation, detailed elevation, and cross-sectional views of a retrievable bridge plug incorporating seal apparatus according to an embodiment of the invention, shown in a collapsed run-in position;

FIGS. 8A and 8B are respectively detailed elevation and sectional views of the apparatus of FIGS. 7A to 7C, shown in a set position;

FIGS. 9A and 9B are respectively detailed elevation and sectional views of the apparatus of FIGS. 7A to 7C, shown in a retrieval position.

DETAILED DESCRIPTION OF PREFERRED EMBODIMENTS

Figure 1A:
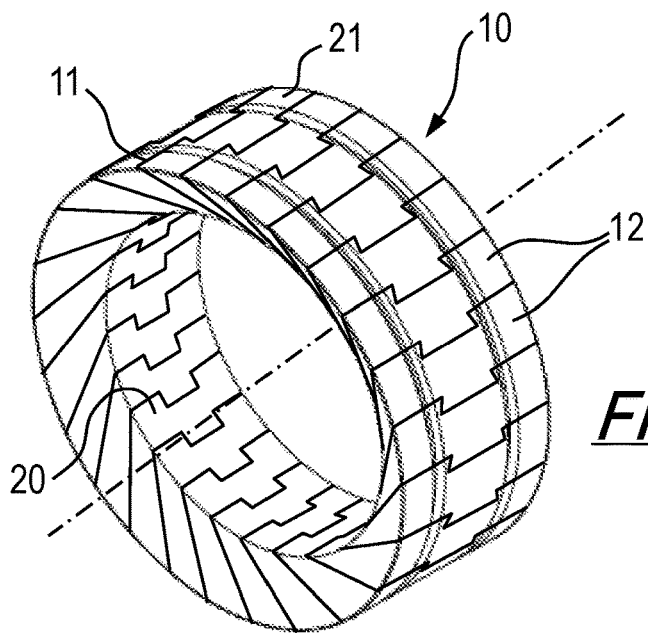
FIGS. 1A to 1C are respectively first perspective, end, and second perspective views of a seal apparatus according to a first embodiment of the invention, shown in an expanded condition.

Referring firstly to FIGS. 1 to 6, the principles of the invention will be described with reference to a seal apparatus in accordance with a first embodiment. In this embodiment, the seal apparatus, generally depicted at 10, comprises a seal ring structure configured to be expanded from a first collapsed or unexpanded condition (shown in FIGS. 1A to 1C) and a second expanded condition (shown in FIG. 2). The apparatus of this and other embodiments may be referred to as "expanding seal apparatus" for convenience, as they are operable to move to an expanded state from a normal collapsed state. However, the apparatus may equally be referred to as a collapsing seal apparatus, or an expanding or collapsing seal apparatus, as it is capable of being expanded or collapsed depending on operational state.

The seal apparatus 10 comprises a plurality of seal elements 12 assembled together to form a ring structure 11. The individual seal elements 12 are most clearly shown in FIGS. 6A to 6D, and together define an inner ring surface which is configured to be supported by the outer surface of cylinder in use. Each seal element comprises an inner surface 20, an outer surface 21 and first and second contact surfaces 22, 23. The first and second contact surfaces are oriented in non-parallel planes, which are tangential to a circle centred on the longitudinal axis L-L' of the apparatus. In use, the first and second contact surfaces of adjacent elements are mutually supportive. The planes converge towards the inner surface 20 of the element. Therefore, each element is in the general form of a wedge of a cylindrical ring 40 (FIG. 5A), and the wedges are assembled together in a circumferentially overlapping fashion to form the ring structure 11.

An objective of this embodiment of the invention is to provide a seal in an expanded condition, and as such the elements are designed such that they together from a substantially solid ring assembly when in their expanded condition, with a smooth circular outer surface and a smooth circular inner surface.

When the seal ring structure is expanded to its optimal outer diameter, the orientation planes of the first and second contact surfaces of the seal elements intersect an inner surface of the seal ring structure, and together with the longitudinal axis of the apparatus, the lines of intersection define a sector of a cylinder. In this case, the ring structure is formed from twenty-four identical elements, and the central angle $\theta_1$ of the sector of the cylinder is 15 degrees. The angle described between the orientation planes of the first and second contact surface is the same as the central angle of the cylindrical sector, so that the elements are arranged rotationally symmetrically in the ring structure.

As most clearly shown in FIGS. 6A to 6D, the first and second contact surfaces of the seal elements have corresponding interlocking profiles 24 formed therein, such that adjacent elements can interlock with one another. In this case, the interlocking profiles comprise a dovetail groove 25 and a corresponding dovetail tongue 26. The interlocking profiles resist circumferential and/or radial separation of the elements in the ring structure, but permit relative sliding motion between adjacent elements. The interlocking profiles also facilitate smooth and uniform expansion and contraction of the elements during use. It will be appreciated that alternative forms of interlocking profiles, for example comprising recesses and protrusions of other shapes and forms, may be used within the scope of the invention.

The elements are also provided with inclined side wall portions 27, which may facilitate deployment of the apparatus in use. The side wall portions are formed in an inverted cone shape which corresponds to the shape and curvature of actuating cone wedges profiles when the apparatus is in its maximum load condition (typically at its optimum expansion condition).

The seal elements are formed from a compliant, compressible and resilient material, which in this embodiment is Hydrogenated Nitrile Butadiene Rubber (HNBR), and are formed by an injection moulding process. It will be appreciated that other compliant, compressible or resilient materials may be used in alternative embodiments of the invention, and the material may be selected in dependence on the conditions to be experienced in use. For example, the seal elements may be formed from a fluoroelastomer, fluoropolymer or fluoro rubber, which may for example be an FKM or FPM such as the FPM manufactured by or under license from DuPont Performance Elastomers and designated by the registered trade mark VITON®. Alternatively, or in addition, the seal elements may be formed from a fluoroelastomer based upon an alternating copolymer of tetrafluoroethylene and propylene rubber, such as the fluoropolymer manufactured by or under license from Asahi Glass Co., Ltd and designated by the registered trade mark AFLAS®. Other methods for forming the seal elements may be used, including but not limited to three-dimensional printing, casting, machining, or combinations of the above processes.

Each element is also provided with a pair of grooves 28, and in the assembled ring structure, the grooves are aligned to provide a circular groove which extends around the ring. Each groove accommodates a biasing element (not shown), for example a spiral retaining ring of the type marketed by Smalley Steel Ring Company™ under the Spirolox™ brand, or a garter spring. In this case, the biasing means is located around the outer surface of the elements, to bias the apparatus towards the collapsed condition shown in FIGS. 1A to 1C. Although two grooves for accommodating a biasing means is provided in this embodiment, in alternative embodiments of the apparatus, a single groove, or a number of grooves greater than two, may be provided with corresponding biasing means.

The apparatus 10 of this embodiment is configured for actuation by an axial force from a wedge member (not shown), which in this case is in the form of an annular ring having a conical surface opposing one side of the ring structure 11. The wedge angle corresponds with the angle of the inclined conical side walls or flanks 27 of the elements. In this case the angle described between the conical side walls or flanks and the longitudinal axis of the ring is 60 degrees, although other angles may be selected depending on application. In alternative embodiments of the invention this optional additional wedge may be substituted with an abutment shoulder.

Figure 4:
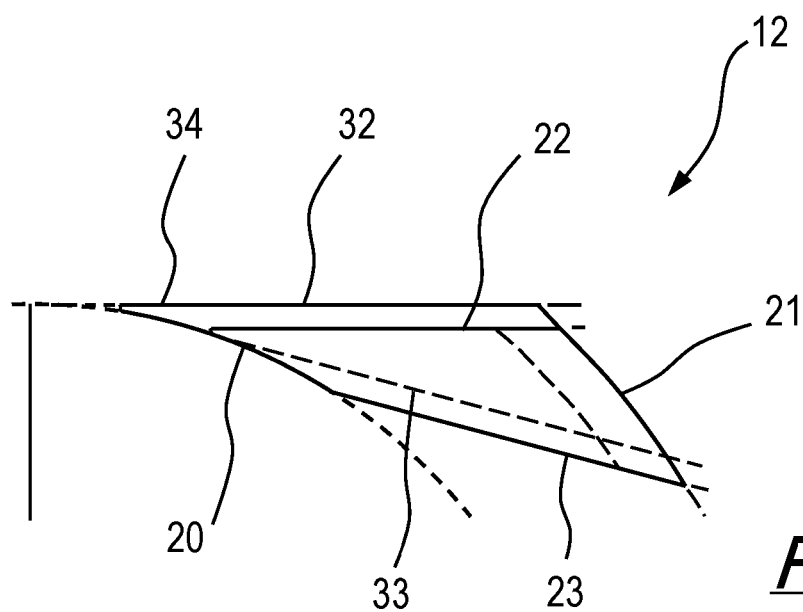
FIG. 4 is a side view of a seal element of the apparatus of FIGS. 1 to 3.
Figure 5A:
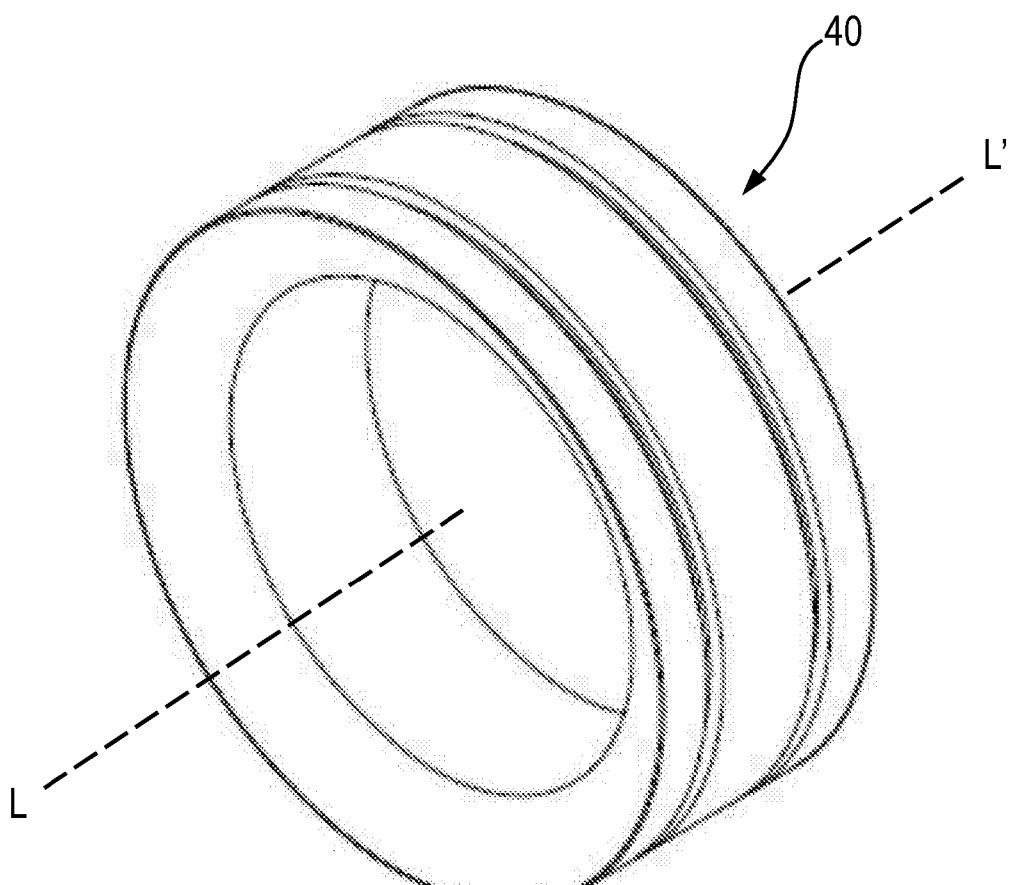
FIGS. 5A and 5B are geometric representations useful for understanding the geometry of an element of the apparatus of FIGS. 1 to 3.
Figure 5B:
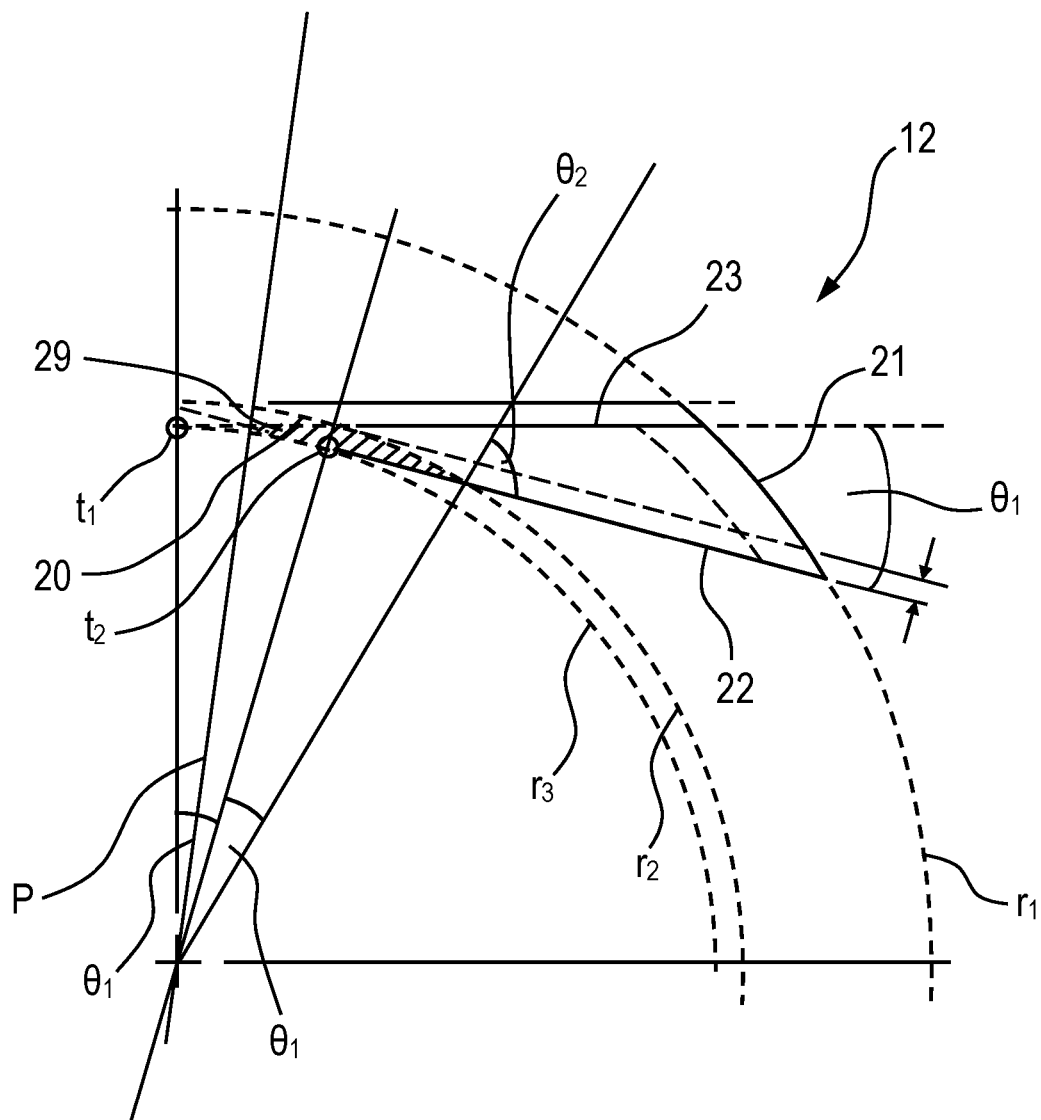
Figure 6A:
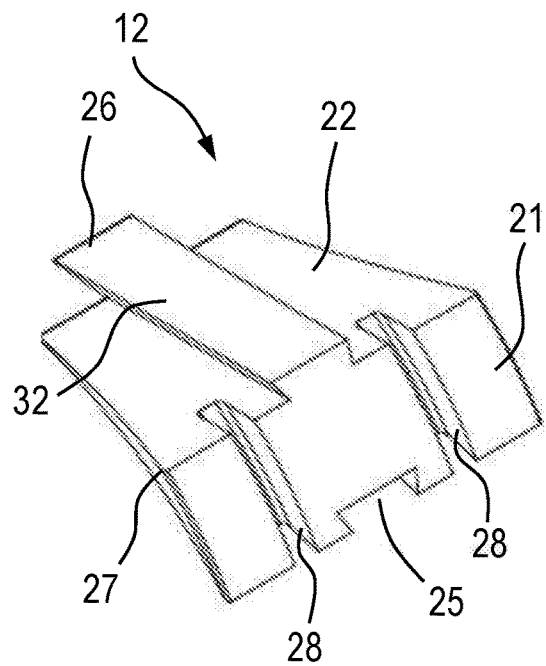
FIGS. 6A to 6D are respectively first isometric, second isometric, first end, and second end views of an element of the apparatus of FIGS. 1 to 3.
Figure 6B:
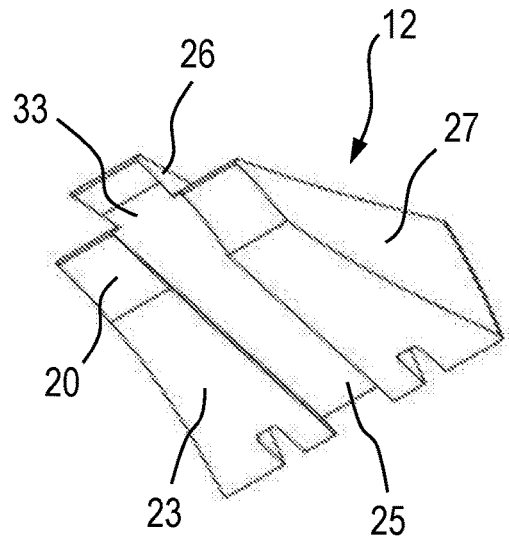
Figure 6C:
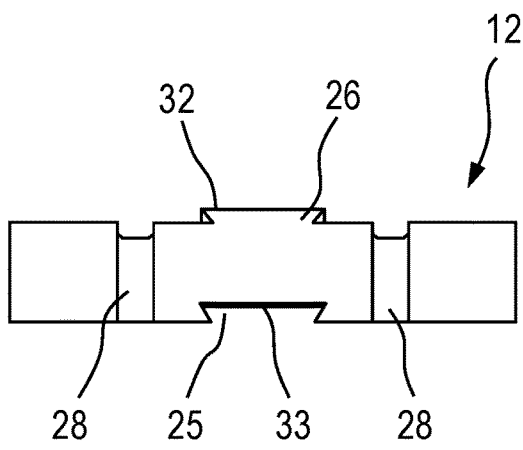
Figure 6D:
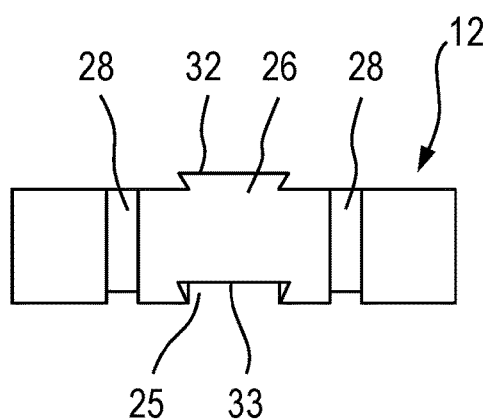

As illustrated with reference to FIGS. 4 to 5B, each element 12 is based on a notional wedge-shaped segment of a ring centred on an axis, with each notional wedge-shaped segment being inclined with respect to the radial direction of the ring. The nominal outer diameter of the segment is at the optimum expansion condition of the ring (with radius shown at $r_1$).

Taking the first and second contact surfaces 22, 23 as the primary defining surfaces (i.e. ignoring for now the surfaces created by the dovetail tongue and groove), the orientation planes of the surfaces of the element are tangential to a circle with radius $r_3$ and concentric with the ring at tangent points $t_1$, $t_2$. The angle described between the tangent points is equal to the angle $\theta_1$ of the segment. The orientation planes of the surfaces of each notional wedge-shaped segment intersect one another on a radial plane P which bisects radial planes located at the tangent points (i.e. is at an angle of $\theta_1/2$ to both). This intersection plane P defines the expanding and collapsing path of the segment.

Figure 1B:
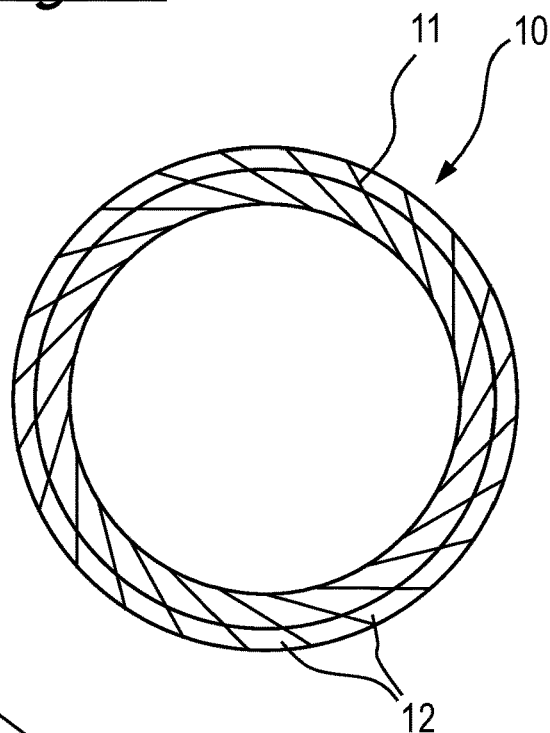
Figure 1C:
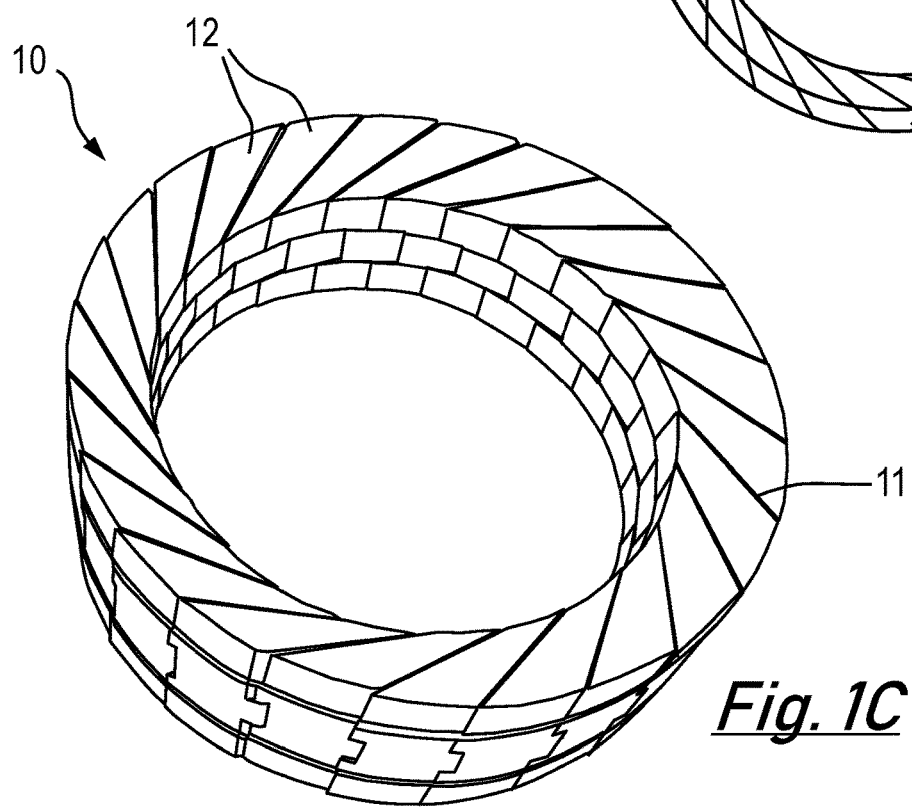
Figure 2:
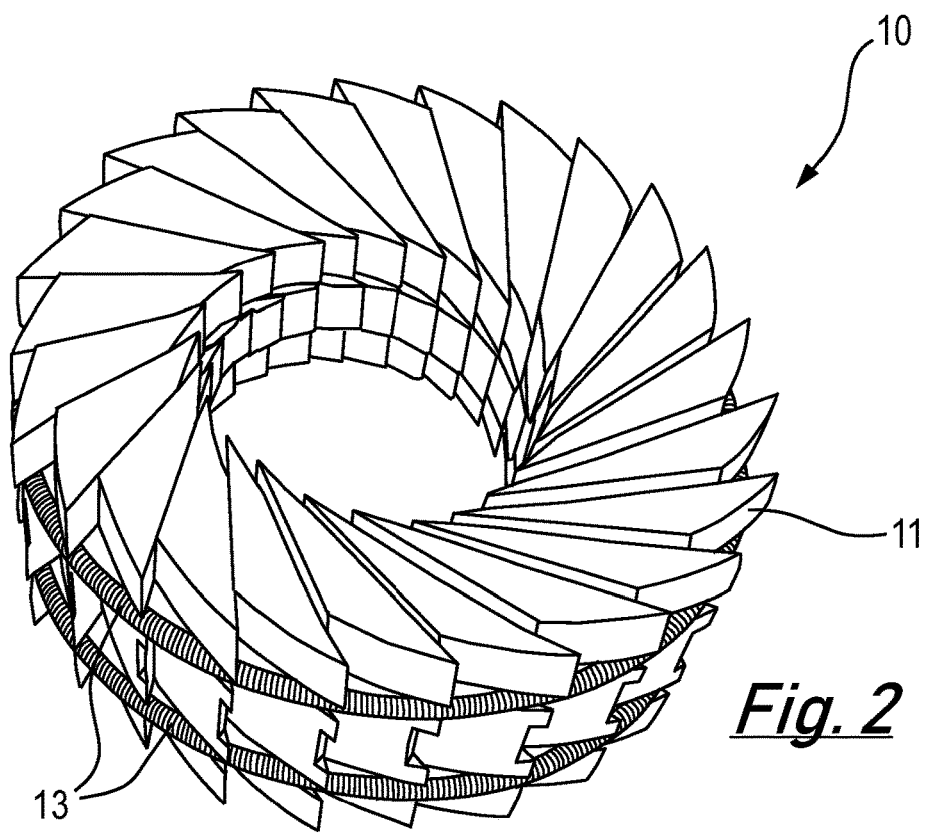
FIG. 2 is a perspective view of the apparatus of FIGS. 1A to 1C, shown in a collapsed condition.

In the present embodiment, notional wedge-shaped segments are modified by removal of material 29 from the main body of the wedge at its tip, to provide a curved or arced inner surface 20 with radius $r_2$ when the ring is in its expanded condition shown in FIGS. 1A to 1C. The modification of the wedge-shaped elements can be thought of as an increase in diameter of an internal bore through the ring structure by $2(r_2-r_3)$, or a truncation of the inner diameter. This change in the inner diameter from the notional inner diameter $r_3$ to which the contact surfaces are tangential, to a truncated inner diameter $r_2$, has the effect of changing an angle between the contact surfaces and the radial plane from the centre of the ring. Taking angle $\theta_2$ to be the angle described between the contact surface and a radial plane defined between the centre point of the ring structure and the point at which the orientation surface meets or intersects a circle at the radial position of the inner surface, $\theta_2$ is changed in dependence on the amount by which the segment has its inner diameter truncated. For the notional wedge-shaped segment, the orientation planes of the contact surfaces are tangential to a circle at the inner diameter at $r_3$ (i.e. angle $\theta_2$ is 90 degrees). For the modified elements 12, the orientation planes of the contact surfaces instead intersect a circle at the (increased) inner diameter at $r_2$, and are inclined at a reduced angle $\theta_2$.

The angle $\theta_2$ at which the segment is inclined is related to the amount of material removed from the notional wedge-shaped segment, but is independent from the central angle $\theta_1$ of the wedge. Angle $\theta_2$ is selected to provide element dimensions suitable for manufacture, robustness, and fit within the desired annular volume and inner and outer diameters of the collapsed ring. As the angle $\theta_2$ approaches 90 degrees, a shallower, finer wedge profile is created by the element, which may enable optimisation of the collapsed volume of the ring structure. Although a shallower, finer wedge profile may have the effect of reducing the size of the gaps created at the inner surface of the ring in the collapsed condition and/or enabling a more compact collapsed condition, there are some consequences. These include the introduction of flat sections at the inner surfaces of the elements, which manifest as spaces at the inner diameter of the ring when in an expanded or partially expanded condition. When $\theta_2=90$ degrees, all the segments are purely tangential to inner diameter, the collapsed volume for a given outer diameter and inner diameter is most efficient, but the inner surface of the ring structure is polygonal with flat sections created by each segment. In some configurations, these flat sections may be undesirable. There may also be potential difficulties with manufacture of the elements and robustness of the elements and assembled ring structure. However, in many applications, where the profile of the inner surface of the expanded ring is not critical, for example when the inner diameter of the ring structure is floating, and/or the true inner diameter is defined by an actuation wedge profile rather than the inner surface of the ring, this compromise may not be detrimental to the operation of the apparatus, and the reduced collapse volume may justify an inclination angle $\theta_2$ of (or approaching) 90 degrees.

In the apparatus of FIGS. 1 to 6, the angle $\theta_2$ is 75 degrees. Relaxing $\theta_2$ to a reduced angle provides a smooth outer diameter and inner diameter profile on the main contact surfaces the expanded ring, as a portion of the inner circular arc is retained at the expense of slightly increased collapsed volume. It should be noted that the angle $\theta_2$ is independent from the angle $\theta_1$. Where the ring structure is desired to have a circular inner surface, preferred arrangements may have an angle $\theta_2$ which is in the range of (90 degrees−$2\theta_1$) to 90 degrees inclusive, and particularly preferred arrangements have an angle $\theta_2$ in the range of 70 degrees to 90 degrees (most preferably in the range of 73 degrees to 90 degrees). In general, to provide sufficient truncation of the inner diameter to retain a useful portion of an inner arc and provide a smooth inner surface to the ring structure, a maximum useful value of $\theta_2$ is (90 degrees−$\theta_1/2$). This would be 82.5 degrees in the described arrangements.

In this application, the main contact surfaces 22, 23 on opposing lateral sides of a central axis of the element are designed to create a seal with an inner actuating surface in the optimal expanded condition, and it is therefore advantageous for the seal elements to be truncated to a reduced inner diameter so that smooth, circular inner surfaces are formed on either side of the expanded seal ring to avoid uneven stresses in the seal elements.

However, in this embodiment, the seal element has interlocking formations having a different geometrical arrangement. The seal element 12 is provided with a tongue 26 and groove 25, having surfaces 32, 33 parallel to the contact surfaces 22 and 23 respectively. The respective tongue and groove surfaces are effectively surfaces of a wedge which is offset (or "raised" in the orientation shown in FIG. 5A) from the surfaces 22 and 23 by the depth of the groove and height of the tongue. In this embodiment, the notional wedge of the surfaces 32, 33 is unmodified save for the rounding of sharp edges, without removal of material from the tip of the tongue/groove portion to truncate the inner diameter. The surfaces 32 and 33 are oriented in planes tangential to the functional inner diameter $r_2$ of the ring structure (i.e. $\theta_2=90$ degrees). This configuration provides an extended tip or nose 34 in the central region of each seal element, which partially extends into a channel created by a groove of an adjacent seal element when the ring is in its expanded condition. The extended tips or noses 34 provide mutual support for an adjacent element, reducing the likelihood of an effective crease point manifesting through which the seal element may tend to collapse under pressure. The flattened sections of the expanded ring created by this part of the element being purely tangential to inner diameter, is not detrimental the ability of the seal apparatus to create a seal, as smooth circular inner surfaces are defined on flanks on either side of the seal.

In other configurations, also in accordance with embodiments of the invention (and as will be described below) the geometry of the notional wedge-shaped segments forming the elements may be varied, with different lateral portions of the seal element being truncated to provide a smooth expanded inner diameter for the creation of an internal sealing surface. Indeed, there may be no requirement for the ring structure to have a circular inner surface in some embodiments, depending on the material selection (for example hardness) and sealing applications.

Operation of the expansion apparatus will now be described. In the first, collapsed or unexpanded condition, shown most clearly in FIG. 2, the elements are assembled in a ring structure 11 which extends to a first outer diameter. The elements are biased towards the unexpanded condition by spiral retaining springs 13, and in use would be supported on their inner surface by the outer surface of a cylinder or mandrel.

In use, an axial actuation force is imparted on a wedge member. Any of a number of suitable means known in the art can be used for application of the axial actuation force, for example, the application of a force from an outer sleeve positioned around a base cylinder. The force causes the wedge member to move axially with respect to the cylinder, and transfer a component of the axial force onto the recessed side wall of the elements. The angle of the wedge transfers a radial force component to the elements 12, which causes them to slide with respect to one another along their respective contact surfaces.

The movement of the expanding elements is tangential to a circle defined around the longitudinal axis of the apparatus. The contact surfaces of the elements mutually support one another before, during, and after expansion. The radial position of the elements increases on continued application of the axial actuation force until the elements are located at a desired outer radial position. This radial position may be defined by a controlled and limited axial displacement of the wedge member, or alternatively can be determined by an inner surface of a bore or tubular in which the apparatus is disposed.

FIGS. 1A to 1C show the apparatus in its expanded condition. At an optimal expansion condition, shown in FIG. 1B, the outer surfaces of the individual seal elements combine to form a complete circle with no gaps in between the individual elements. The outer surface of the expansion apparatus can be optimised for a specific diameter, to form a perfectly round expanded ring (within manufacturing tolerances) with no gaps on the inner or outer surfaces of the ring structure. The design of the expansion apparatus also has the benefit that a degree of under expansion or over expansion (for example, to a slightly different radial position) does not introduce significantly large gaps.

Figure 3:
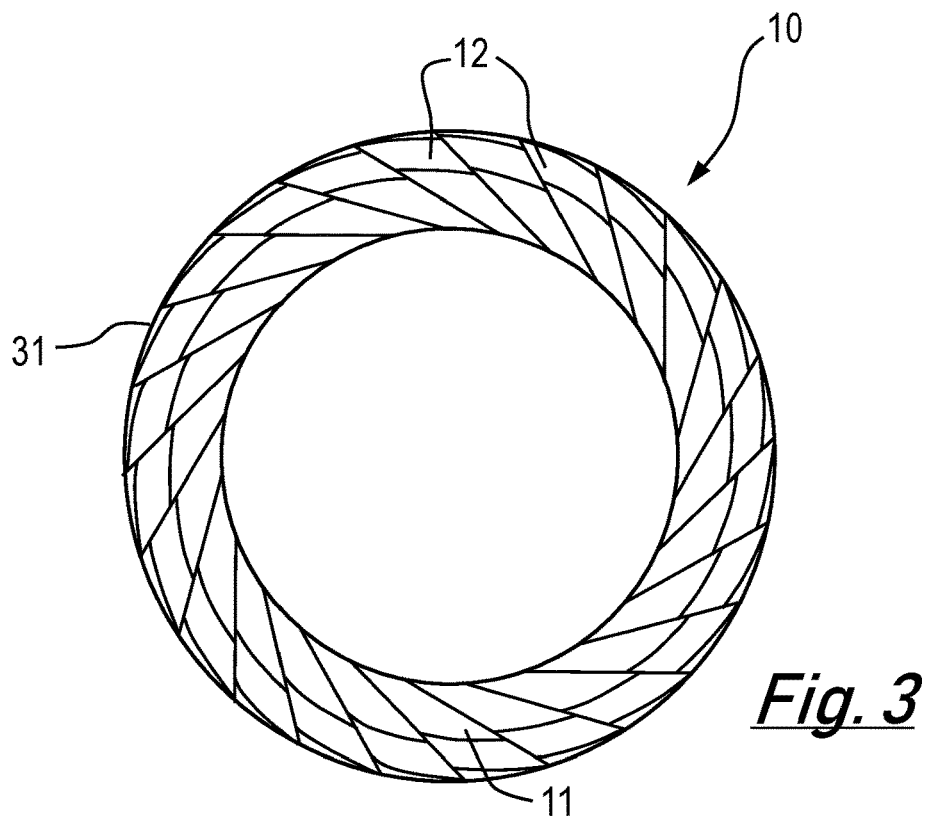
FIG. 3 is a perspective view of the apparatus of FIGS. 1A to 1C, shown in a partially expanded condition.

FIG. 3 shows the seal apparatus approaching a notional seal diameter 31, which is the inner diameter of a tubular with which the seal apparatus is required to seal. The apparatus may be designed such that the optimal expansion condition of the seal apparatus is selected to correspond to the notional seal diameter, or it may be designed such that the optimal expansion condition of the seal apparatus is slightly greater than the notional seal diameter, such that expansion to the optimal expansion condition (beyond the inner diameter of the auxiliary surface) compresses the seal elements together.

The inner surface of the expanded ring structure, and in particular the inner circular surfaces created by the truncated inner contact surfaces laterally outward of the interlocking formations, create a seal with the actuation wedges in use. The seal apparatus therefore seals on both its outside surface and its inner surface, and is capable of sealing an annular space between a base pipe or mandrel and an outer surface.

A significant benefit of embodiments of the invention is that during deployment to the expanded diameter at which a seal is created, there is no compression of the seal elements until the seal elements come into contact with the surrounding surface. Therefore the substantial stresses and strains to which conventional annular seal elements are exposed during deployment are reduced or avoided. This mitigates or eliminates damage to the seal element caused by stresses and strains experienced during its deployment.

Release or reduction of the actuating force on the seal apparatus results in a reversal of the movement of the seal elements, aided by the biasing springs. The seal elements slide tangentially with respect to one another along their respective contact surfaces, and the contact surfaces of the elements mutually support one another before, during, and after collapsing. Satisfactory retraction of the seal element is facilitated by the absence of stresses and strains on the seal elements during deployment.

It is a feature of the invention that the seal elements are mutually supported before, throughout, and after the expansion, and do not create gaps between the individual elements during expansion or at the fully expanded position. In addition, the arrangement of elements in a circumferential ring, and their movement in a plane perpendicular to the longitudinal axis, facilitates the provision of smooth side faces or flanks on the expanded ring structure. With deployment of the elements in the plane of the ring structure, the overall width of the ring structure does not change. This enables use of the apparatus in close axial proximity to other functional elements.

There will now be described an application of the expansion apparatus of the invention to a downhole oilfield apparatus, specifically a retrievable bridge plug. A retrievable bridge plug is a downhole tool which is located and set to isolate a part of the wellbore, in a way that enables it to be unset and retrieved from the wellbore after use. A typical retrievable bridge plug includes an arrangement of slips for anchoring the plug in the well, and a seal element for creating a fluid seal. An unsupported seal assembly may have a tendency to deform and fail through an extrusion gap between the maximum outer diameter of a gauge ring which supports the seal and the surrounding bore to which the seal element has been expanded. The seal apparatus of the invention offers a number of advantages in a bridge plug application, as will be apparent from the following description.

FIGS. 7A to 9B are views of a retrievable bridge plug according to an embodiment of the invention, into which a seal apparatus 60 has been incorporated. The bridge plug also incorporates additional ring structures to perform anchoring and anti-extrusion functions. FIGS. 7A to 7C are respectively elevation, detailed elevation, and cross-sectional views of a retrievable bridge plug 50 in a collapsed run-in position.

The plug 50 comprises a housing assembly 51, and upper and lower connectors 52, 53 for connecting the plug into a tool string. The housing assembly 51 comprises upper and lower housing subs 54, 55 located on a mandrel 56 on either side of a seal and anchor assembly 57. An actuation sleeve connects the upper and lower housing subs on the mandrel.

The slip and seal assembly 57 comprises an expanding slip assembly 60, an expanding anti-extrusion ring 61, and a seal apparatus 62 disposed between the expanding slip assembly 60 and the expanding anti-extrusion ring 61. The seal apparatus 62 is similar to the seal apparatus 10, and will not be described in detail, but will be understood from FIGS. 1 to 6 and the accompanying description.

The individual elements 63 of the seal apparatus 62 are similar to the elements 12, and comprise inner and outer surfaces and first and second contact surfaces. The first and second contact surfaces are oriented in non-parallel planes, which are tangential to a circle centred on the longitudinal axis of the apparatus. The elements 63 also comprise corresponding interlocking profiles. The seal assembly 62 differs from the seal assembly 10 in that the conical angle on the side walls or flanks of the seal elements is 45 degrees, corresponding to the angle of its actuating wedges.

The slip assembly 60 and the expanding anti-extrusion ring 61 are also constructed and operated according to the principles of the invention. The slip assembly 60 comprises a ring structure formed from a number of individual expansion slip elements, which interlock to create the ring structure. Each slip element 77 and each ring element 177 is similar in form and function to the elements 12 and 63, and their operation will be understood from the foregoing description. However, the slip elements 77 and the ring elements 177 differ in that they are formed from relatively hard materials, such as a metal or metal alloy, rather than a compliant, compressible or resilient material from which the seal elements are formed.

In this embodiment, the outer surface of each slip element 77 is provided with engaging means 78 defined by a series of grooves and ridges in the outer surface, disposed on either side of retaining ring grooves. In this embodiment, the slip elements 77 are bidirectional; the engaging means on respective sides of the of the slip surface are asymmetrically formed in opposing directions, to provide an anchoring forces which resist movement in both upward and downward directions. The conical angle on the side walls or flanks of the slip elements is 30 degrees, corresponding to the angle of its actuating wedges.

In contrast, the outer surface of each ring element 177 is smooth, and is configured to such that at an optimal expansion condition, the outer surfaces of the individual ring elements combine to form a complete circle with no gaps in between the individual elements. The outer surface of the expansion apparatus can be optimised for a specific diameter, to form a perfectly round expanded ring (within manufacturing tolerances) with no extrusion gaps on the inner or outer surfaces of the ring structure. The design of the expansion apparatus also has the benefit that a degree of under expansion or over expansion (for example, to a slightly different radial position) does not introduce significantly large gaps. The conical angle on the side walls or flanks of the ring elements 177 is 60 degrees, corresponding to the angle of its actuating wedges.

Operation of the bridge plug will now be described with particular reference to FIGS. 7C, 8 and 9. When the plug is located at the desired position in the wellbore, it is ready to be set, and a setting tool is used to impart a force to the plug in a manner known in the art. In this example embodiment, a setting tool (not shown) imparts a downward force on the outer housing 51 relative to the mandrel 56, resulting in a relative movement between the upper housing sub and the lower housing sub 55.

Downward movement moves the fixed upset wedge profile 66, 67 towards the slip assembly 60, to impart an axial force on the slip assembly 60. The slip assembly is axially compressed between the wedge profile 66 of the actuation sleeve and a lower wedge profile 67 on the lower housing sub 55. The slip elements slide with respect to one another in a tangential direction and move to their radially extended positions, in the manner of the seal apparatus described with reference to FIGS. 1 to 6. The outer surface of the ring structure formed by the slip elements is moved into engagement with the inner surface of the wellbore, where the engaging means anchors the slips at the plug to the wellbore. As the upper housing sub moves downwards with respect to the mandrel, a ratchet sleeve and ratchet clip locks the position of the sub 54, and prevents return movement of the housing and release of the slips.

A further downward force on the upper housing sub with respect to the inner mandrel causes upper shear screws to shear, which enables the upper housing sub 54 to move downwards with respect to the mandrel 56. Movement of the upper housing assembly 54 imparts an axial force on the anti-extrusion ring 60 between a wedge profile 68 of the upper housing sub 54 and a movable wedge member 69 disposed between the seal assembly 62 and the anti-extrusion ring 60. The axial force results in radial deployment of the element in the manner described above. The downward force also acts on the movable wedge member 69 to act on the seal apparatus 62 between the wedge 69 and the upset profile 66 on the slip actuation sleeve. The seal elements 63 of the seal apparatus 62 slide with respect to one another in a tangential direction and move to their radially extended positions, in the manner of the seal apparatus described with reference to FIGS. 1 to 6, to an expanded condition in which the seal apparatus is in contact with the surrounding wellbore wall. The expanded condition is shown in FIGS. 8A and 8B, with the position locked by a ratchet sleeve and ratchet clip to prevent return movement of the housings and release of the slip assembly 60 and the anti-extrusion ring 61. The anti-extrusion ring 61 provides a full extrusion barrier at the upper end of the seal element 62. The expanded slip assembly 60 provides a similar anti-extrusion barrier at the lower end of the seal 62, in addition to its anchoring functionality.

By appropriate use of shear screws the plug is made operable to fully deploy the slip assembly and the anti-extrusion ring before the seal element is fully compressed. This ensures that there is a fully contained volume, with little or no extrusion gap, into which the seal apparatus is deployed. In a preferred embodiment of the anti-extrusion ring is fully expanded before the seal apparatus is deployed.

As noted above, the seal elements, slip elements, and ring elements are mutually supported before, throughout, and after expansion, and do not create gaps between the individual elements during expansion or at the fully expanded position. The arrangement of elements in circumferential rings, and their movement in planes perpendicular to the longitudinal axis, facilitates the provision of smooth side faces or flanks on the expanded structures. With deployment of the elements in the plane of the ring structure, the overall width of the respective ring structures does not change. This enables use of the apparatus in close axial proximity to other functional elements. The seal apparatus is therefore expanded into a fully contained volume created by the adjacent expanding and collapsing ring structures.

With the extrusion gap minimised or eliminated, the seal apparatus is well-supported, and extrusion when exposed to stresses and strains from differential pressures in pressure isolation applications is limited. Damage to the seal elements may therefore be reduced with respect to prior art arrangements. This may be manifested as an improvement in the pressure-retaining capabilities of the seal and/or its longevity, improvements in retraction of the seal and retrievability of the plug, and/or improved flexibility in seal applications, tool design parameters, and/or material choices.

In some embodiments, the improved seal configuration may enable selection of alternative materials for the seal elements. The resistance to extrusion may enable use of relatively soft compliant, compressible or resilient materials, which may for example facilitate sealing at higher pressure differences. Alternatively, or in addition, design parameters such as seal volume and tool length may be optimised to the particular application.

FIGS. 9A and 9B show the plug 50 in a retrieval position. A release tool is run to the plug and engages with a ratchet release sleeve, to move it downwards with respect to the mandrel. Movement of the release sleeve releases keys which support the ratchet sleeve on the mandrel. With the ratchet released, the upper and lower housings and actuation sleeve may move upwards relative to the mandrel, to release the actuation force on the slips and seal, resulting in their collapse. Movement of the sleeve relative to the housing subs results in engagement of an upper ratchet lock-out mechanism between the upper end of the actuation sleeve and the upper housing sub and a lower ratchet lock-out mechanism between the lower end of the actuation sleeve and the lower housing sub. With these components locked together, relative movement of the wedge elements is prevented, to stop expansion of the respective expansion components during pulling out of hole (for example if a restriction is encountered during pulling). The limitation of damage to the seal elements during deployment and use facilitates successful retraction of the plug to a pull-out diameter, shown in FIGS. 9A and 9B.

It will be appreciated that although the invention is described in an application to a retrievable plug, its benefits extend to permanent plugs, including for example those in which anti-extrusion or support for the seal element is provided by a pair of slip assemblies rather than providing a dedicated anti-extrusion ring, and those without slip assemblies being disposed above and below the seal elements.

The foregoing embodiments describe the application of the principles of the invention to wellbore plugs, but it will be apparent from the description that the seal configurations described with reference to FIGS. 1 to 9B may be applied to tools and devices other than downhole plugs. Additional applications of the apparatus are possible which exploit its ability to effectively perform one or more of blocking or sealing an annular path.

The invention also has benefits in expanding a seal into a pre-formed recess at a known location in the wellbore completion. For example, a typical locking profile and locking mechanism includes a recess for mechanical engagement by the radially expanding components of the locking tool. A seal bore is typically provided in the profile, and a seal on the locking tool is designed to seal against the seal bore. Embodiments of the present invention may enable a seal bore (i.e. the part of the completion with which the elastomer creates a seal) to be recessed in a locking profile, or in other downhole applications. In such a configuration it is beneficial to provide expanding anti-extrusion rings, as described with reference to previous embodiments of the invention, disposed on either side of the seal apparatus, in order to back-up the seal and bear the loads associated with the locking engagement.

In variations to the described embodiments, the seal elements may be provided with additional structural elements, which may be formed from materials of relatively high rigidity (such as metals or metal alloys). Additional structural elements include but are not limited to facings of relatively hard material, support rings, or internal support elements. The additional structural elements may be bonded to, embedded with, or otherwise integrated with the seal elements.

In a further variation to the described embodiments, the seal apparatus may be configured to be collapsed to create a seal with a surface of an object arranged internally to the ring structure. The seal assembly may be operable to be moved between an expanded condition and a collapsed condition by movement of the plurality of elements by sliding with respect to one another. The object may be an auxiliary object configured to extend through the ring structure.

In further variations to the described embodiments, the seal elements, or parts thereof, may be coated or otherwise treated with a material to reduce a tendency of the seal elements to fuse or adhere together in use. The material may be an industrial friction reducing material.

The invention provides a segmented seal apparatus and a method of use. The seal apparatus comprises a seal assembly having a plurality of seal elements assembled together to form a ring structure around a longitudinal axis. The ring structure is operable to be moved between an expanded condition and a collapsed condition by movement of the plurality of seal elements. The plurality of seal elements is operable to be moved between the expanded and collapsed conditions by sliding with respect to one another along respective contact surfaces, and the plurality of seal elements are each formed from a compliant, compressible or resilient material. Applications of the invention include oilfield devices, including plugs and packers, and has particular advantages when used with retractable seals in retrievable devices.

The invention in its various forms benefits from the novel structure and mechanism of the apparatus. At an optimal expansion condition, the outer surfaces of the individual seal elements combine to form a complete circle with no gaps in between the individual elements, and therefore the seal apparatus can be optimised for a specific diameter, to form a perfectly round expanded seal ring (within manufacturing tolerances). The design of the expansion apparatus also has the benefit that a degree of under expansion or over expansion (for example, to a slightly different radial position) does not introduce significantly large gaps.

A significant benefit of embodiments of the invention is that during deployment to the expanded diameter at which a seal is created, there is no compression of the seal elements until the seal elements come into contact with the surrounding surface. Therefore the substantial stresses and strains to which conventional annular seal elements are exposed during deployment are reduced or avoided. This mitigates or eliminates damage to the seal element caused by stresses and strains experienced during its deployment.

It is a feature of the invention that the elements are mutually supported before, throughout, and after expansion, and do not create gaps between the individual elements during expansion or at the fully expanded position. In addition, the arrangement of seal elements in a circumferential ring, and their movement in a plane perpendicular to the longitudinal axis, facilitates the provision of smooth side faces or flanks on the expanded seal apparatus. With deployment of the seal elements in the plane of the ring structure, the width of the ring structure does not change. This enables use of the apparatus in close axial proximity to other functional elements, such as slip assemblies and anti-extrusion rings.

Various modifications to the above-described embodiments may be made within the scope of the invention, and the invention extends to combinations of features other than those expressly claimed herein. In particular, the different embodiments described herein may be used in combination, and the features of a particular embodiment may be used in applications other than those specifically described in relation to that embodiment.

The invention claimed is:

1. A seal apparatus comprising:
   a seal assembly comprising a plurality of seal elements assembled together to form a ring structure around a longitudinal axis;
   wherein the ring structure is operable to be moved between an expanded condition and a collapsed condition by movement of the plurality of seal elements;
   and wherein the plurality of seal elements is operable to be moved between the expanded and collapsed conditions by sliding with respect to one another along respective contact surfaces;
   wherein each of the plurality of seal elements is each formed from a compliant, compressible or resilient material;
   wherein at least some of the plurality of seal elements are formed from different materials, or formed with different material characteristics; and
   wherein sequential seal elements in the ring structure are alternately formed from different materials and/or different material characteristics.

2. The seal apparatus according to claim 1, wherein the plurality of seal elements are formed from a plastic, rubber, or elastomeric material.

3. The seal apparatus according to claim 1, wherein the plurality of seal elements are fully formed from the compliant, compressible or resilient material.

4. The seal apparatus according to claim 1, wherein at least a part of one or more of the plurality of seal elements is coated with a low friction material.

5. The seal apparatus of claim 1, wherein the ring structure is operable to be expanded to a seal diameter, at which the plurality of elements are presented to a surface in use, wherein the seal diameter is an outer diameter of the ring structure.

6. The seal apparatus of claim 5, wherein the surface is an inner surface of a tubular, tool or borehole.

7. The seal apparatus according to claim 1, comprising one or more anti-extrusion and/or support rings for the seal assembly.

8. The seal apparatus according to claim 7, comprising one or more additional expanding and collapsing ring structures, which function as anti-extrusion and/or support rings for the seal assembly.

9. The seal apparatus of claim 1, wherein each seal element comprises a first contact surface and second contact surface respectively in abutment with first and second adjacent seal elements.

10. The seal apparatus of claim 9, wherein the first contact surface and/or the second contact surface converge towards one another in a direction towards an inner surface of the ring structure.

11. The seal apparatus of claim 1, wherein the seal elements are provided with interlocking profiles for interlocking with an adjacent seal element.

12. The seal apparatus of claim 1, wherein the ring structure is a solid ring structure in its expanded condition.

13. A seal apparatus comprising:
- a seal assembly comprising a plurality of seal elements assembled together to form a ring structure around a longitudinal axis;
- wherein the ring structure is operable to be moved between an expanded condition and a collapsed condition;
- wherein in the expanded condition, the plurality of elements combine to form a solid seal ring structure having a surface;
- wherein each of the plurality of seal elements is formed from a compliant, compressible or resilient material;
- wherein each element comprises a first contact surface and second contact surface respectively in abutment with first and second adjacent seal elements; and
- wherein the first contact surface and/or the second contact surface converge towards one another in a direction towards an inner surface of the ring structure.

14. The seal apparatus of claim 13, wherein the surface comprises a first surface portion configured for sealing with an external surface to the seal assembly.

15. The seal apparatus of claim 14, wherein the surface comprises a second surface portion configured for sealing with an internal surface to the seal assembly.

16. The seal apparatus of claim 15, wherein the surface comprises a third surface portion, axially separated from the second surface portion, configured for sealing with an internal surface to the seal assembly.

17. A seal apparatus comprising:
- a seal assembly comprising a plurality of seal elements assembled together to form a ring structure around a longitudinal axis;
- wherein the ring structure is operable to be moved between an expanded condition and a collapsed condition by movement of the plurality of seal elements;
- and wherein the plurality of seal elements is operable to be moved between the expanded and collapsed conditions by sliding with respect to one another along respective contact surfaces;
- wherein each of the plurality of seal elements is each formed from a compliant, compressible or resilient material;
- wherein each element comprises a first contact surface and second contact surface respectively in abutment with first and second adjacent elements; and
- wherein the first contact surface and/or the second contact surface converge towards one another in a direction towards an inner surface of the ring structure.

18. The seal apparatus of claim 13, wherein the surface is a smooth surface.

* * * * *